(12) United States Patent
Min

(10) Patent No.: US 9,071,054 B2
(45) Date of Patent: Jun. 30, 2015

(54) DEVICE AND METHOD FOR CONTROLLING POWER ACCORDING TO A LOAD OF A HYBRID EXCAVATOR

(75) Inventor: Gyeong-Mo Min, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 180 days.

(21) Appl. No.: 13/996,749

(22) PCT Filed: Dec. 27, 2010

(86) PCT No.: PCT/KR2010/009353
§ 371 (c)(1),
(2), (4) Date: Jun. 21, 2013

(87) PCT Pub. No.: WO2012/091183
PCT Pub. Date: Jul. 5, 2012

(65) Prior Publication Data
US 2013/0265686 A1 Oct. 10, 2013

(51) Int. Cl.
*H02H 7/20* (2006.01)
*B60L 11/12* (2006.01)
*B60L 11/16* (2006.01)
*B60W 20/00* (2006.01)

(52) U.S. Cl.
CPC ............... *H02H 7/20* (2013.01); *B60L 11/123* (2013.01); *B60L 11/16* (2013.01); *Y02T 10/7077* (2013.01); *Y02T 10/6217* (2013.01); *B60Y 2200/412* (2013.01); *B60W 20/50* (2013.01)

(58) Field of Classification Search
CPC ......... B60L 11/123; B60L 11/16; H02H 7/20; Y02T 10/7077; Y02T 10/6217; B60Y 2200/412

USPC .......................................................... 361/18
See application file for complete search history.

(56) References Cited

U.S. PATENT DOCUMENTS

| 6,519,622 | B1 | 2/2003 | Knowles |
| 6,635,973 | B1 | 10/2003 | Kagoshima et al. |
| 6,760,710 | B1 | 7/2004 | Perg |

(Continued)

FOREIGN PATENT DOCUMENTS

| KR | 10-2001-0043922 A | 5/2001 |
| KR | 10-2001-0071346 A | 7/2001 |
| KR | 10-0604686 B1 | 7/2006 |

OTHER PUBLICATIONS

International Search Report (in Korean and English) and Written Opinion (in Korean) for PCT/KR2010/009353, mailed Sep. 23, 2011; ISA/KR.

(Continued)

*Primary Examiner* — Scott Bauer
(74) *Attorney, Agent, or Firm* — Harness, Dickey & Pierce, P.L.C.

(57) ABSTRACT

A power control apparatus and method according to a load of a hybrid excavator including an H-ECU is disclosed. If a difference between an actual power value actually used in a load (SW PEC and ISAM PEC) or in an ESS and a power value required for an actual use in the load is equal to or larger than a set error value, a power that is supplied from the ESS to the PECs and a power that is supplied between the PECs are controlled to be cut off, and thus high voltage is prevented from being continuously supplied to circuits to thereby prevent secondary problems (e.g., fire, trouble of equipment, and the like) from occurring due to the high voltage.

4 Claims, 1 Drawing Sheet

(56) References Cited

U.S. PATENT DOCUMENTS

| | | | |
|---|---|---|---|
| 6,789,335 B1 | 9/2004 | Kinugawa et al. | |
| 6,938,009 B1 | 8/2005 | Herbst et al. | |
| 7,062,459 B1 | 6/2006 | Herbst et al. | |
| 7,266,520 B1 | 9/2007 | Herbst et al. | |
| 7,278,508 B2 | 10/2007 | Nakada et al. | |
| 7,447,651 B1 | 11/2008 | Herbst et al. | |
| 7,644,029 B2 | 1/2010 | Perg et al. | |
| 7,680,713 B2 | 3/2010 | Perg et al. | |
| 7,702,550 B2 | 4/2010 | Perg et al. | |
| 7,747,489 B2 | 6/2010 | Perg et al. | |
| 7,752,105 B2 | 7/2010 | Perg et al. | |
| 8,468,816 B2 * | 6/2013 | Sora | 60/414 |
| 8,700,275 B2 * | 4/2014 | Edamura et al. | 701/50 |
| 2003/0158882 A1 | 8/2003 | Knowles | |
| 2004/0261609 A1 | 12/2004 | Nakada et al. | |
| 2005/0080698 A1 | 4/2005 | Perg et al. | |
| 2005/0144103 A1 | 6/2005 | Perg et al. | |
| 2006/0074787 A1 | 4/2006 | Perg et al. | |
| 2006/0116944 A1 | 6/2006 | Perg et al. | |
| 2006/0212379 A1 | 9/2006 | Perg et al. | |
| 2007/0214782 A1 * | 9/2007 | Komiyama et al. | 60/431 |
| 2012/0324877 A1 * | 12/2012 | Kang, II | 60/327 |
| 2013/0076128 A1 * | 3/2013 | Nee | 307/10.1 |

OTHER PUBLICATIONS

International Preliminary Report on Patentability (Chapter II) (in Korean) for PCT/KR2010/009353, dated Apr. 18, 2013; IPEA/KR.

* cited by examiner

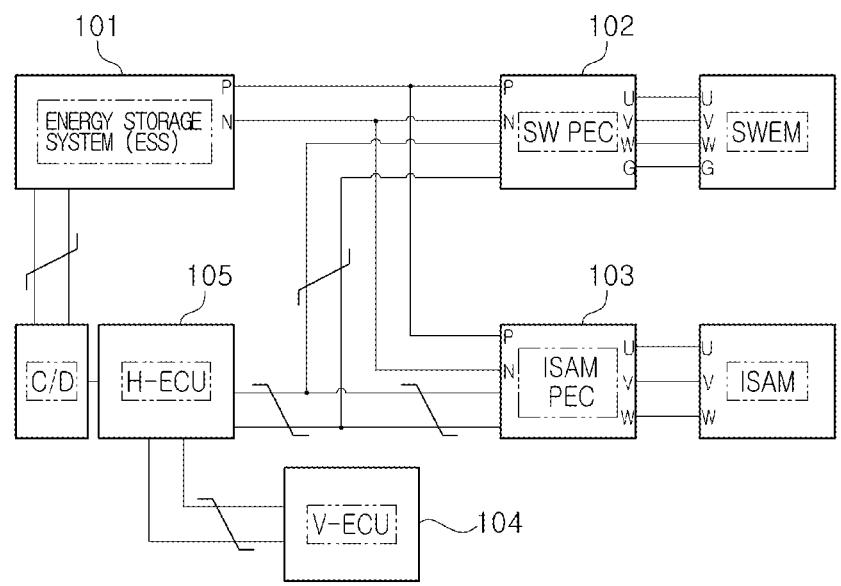

DEVICE AND METHOD FOR CONTROLLING POWER ACCORDING TO A LOAD OF A HYBRID EXCAVATOR

TECHNICAL FIELD

The present invention relates to a power control apparatus and method according to a load of a hybrid excavator. More particularly, the present invention relates to a power control apparatus and method according to a load of a hybrid excavator, in which if a difference between an actual power value actually used in a load (SW PEC (Swing Motor Power Electric Controller) and ISAM PEC (Integrated Starter & Alternator Motor Power Electric Controller)) or in an ESS (energy Storage System) and a power value required for an actual use in the load is equal to or larger than a set error value, the power that is supplied from the ESS to the PECs and the power that is supplied between the PECs are controlled to be cut off, and thus high voltage is prevented from being continuously supplied to circuits to thereby prevent secondary problems (e.g., fire, trouble of equipment, and the like) from occurring due to the high voltage.

BACKGROUND ART

In the related art, in the case where the SW PEC or ISAM PEC operates erroneously, or a foreign substance or human body is sandwiched between wirings through which high voltage is supplied, a fuse primarily cuts off the high voltage. However, if a load that does not exceed a limit value of the fuse is applied, the ESS is unable to recognize this, and thus the high voltage is continuously supplied to cause fire or trouble of the equipment to occur.

DISCLOSURE

Technical Problem

Therefore, the present invention has been made to solve the above-mentioned problems occurring in the related art, and one subject to be achieved by the present invention is to provide a power control apparatus and method according to a load of a hybrid excavator, in which voltage/current on circuits, to which high voltage is supplied, is recognized, and if a load that exceeds a predetermined error value is generated, the high voltage is cut off and is prevented from being continuously supplied to the circuits to thereby prevent secondary problems (e.g., fire, trouble of equipment, and the like) from occurring due to the high voltage.

Technical Solution

In accordance with one aspect of the present invention, there is provided a power control apparatus according to a load of a hybrid excavator, which includes an ESS (Energy Storage System); a SW PEC (Swing Motor Power Electric Controller) and an ISAM PEC (Integrated Starter & Alternator Motor Power Electric Controller) connected to the ESS; and a H-ECU (H-Electronic Control Unit) comparing an actual power value (P3), which is obtained by adding a power value (P1) calculated by a voltage or current value input to or output from the SW PEC to a power value (P2) calculated by a voltage or current value input to or output from the ISAM PEC, with a power value required for a load (P4=A×an operation amount of a RCV lever+B×an engine RPM value+α, herein A and B are coefficients and α is a power loss value) calculated by applying the operation amount of the RCV lever and the engine RPM value, determining there is abnormality in the case where a difference between the two power values exceeds a set error range, and operating to cut off a power supplied from the ESS to the PECs and a power supplied between the PECs, or comparing a power value (P5) calculated by a voltage or current value input to or output from the ESS with the power value (P4) required for the load, determining there is abnormality in the case where a difference between the two power values exceeds the set error range, and operating to cut off the power supplied from the ESS to the PECs and the power supplied between the PECs.

Preferably, the H-ECU may include a first actual power value calculation unit calculating the actual power value (P3) by adding the power value (P1) calculated by the voltage or current value input to or output from the SW PEC to the power value (P2) calculated by the voltage or current value input to or output from the ISAM PEC; a load required power value calculation unit calculating the power value for the load (P4=A×the operation amount of the RCV lever+B×the engine RPM value+α, herein A and B are coefficients and α is the power loss value) calculated by applying the operation amount of the RCV lever and the engine RPM value received from a V-ECU (Vehicle Electronic Control Unit); and a first power-off control unit determining there is abnormality in the case where the difference between the calculated actual power value (P3) and the power value (P4) required for the load exceeds the set error range, and operating to cut off the power supplied from the ESS to the PECs and the power supplied between the PECs.

The H-ECU may further include a second actual power value calculation unit calculating the actual power value (P5) by the voltage or current value input to or output from the ESS; and a second power-off control unit determining there is abnormality in the case where the difference between the actual power value (P5) and the power value (P4) required for the load exceeds the set error range, and operating to cut off the power supplied from the ESS to the PECs and the power supplied between the P ECs.

In accordance with another aspect of the present invention, there is provided a power control method according to a load of a hybrid excavator, which includes comparing an actual power value (P3), which is obtained by adding a power value (P1) calculated by a voltage or current value input to or output from a SW PEC to a power value (P2) calculated by a voltage or current value input to or output from an ISAM PEC; calculating a power value required for a load (P4=A×an operation amount of a RCV lever+B×an engine RPM value+α, herein A and B are coefficients and α is a power loss value) calculated by applying the operation amount of the RCV lever input from a V-ECU (Vehicle Electronic Control Unit) and the engine RPM value; determining there is abnormality in the case where a difference between the calculated actual power value (P3) and the power value (P4) required for the load exceeds a set error range, and operating to cut off a power supplied from an ESS to the PECs and a power supplied between the PECs; calculating an actual power value (P5) by a voltage or current value input to or output from the ESS; and determining there is abnormality in the case where a difference between the actual power value P5 and the power value (P4) required for the load exceeds the set error range, and operating to cut off the power supplied from the ESS to the PECs and the power supplied between the PECs.

Advantageous Effect

According to the present invention, if the difference between the actual power value actually used in the load (SW PEC and ISAM PEC) or in the ESS and the power value required for the actual use in the load is equal to or larger than the set error value, the power that is supplied from the ESS to the PECs and the power that is supplied between the PECs are controlled to be cut off, and thus the high voltage is prevented from being continuously supplied to the circuits to thereby prevent the secondary problems (e.g., fire, trouble of equipment, and the like) from occurring due to the high voltage.

BRIEF DESCRIPTION OF THE DRAWINGS

The above objects, other features and advantages of the present invention will become more apparent by describing the preferred embodiments thereof with reference to the accompanying drawing, in which:

FIG. 1 is a block diagram illustrating the configuration of a power control apparatus according to a load of a hybrid excavator.

DESCRIPTION OF REFERENCE NUMERALS IN THE DRAWING

101: energy storage system (ESS)
102: SW PEC
103: ISAM PEC
104: V-ECU
105: H-ECU

BEST MODE

Hereinafter, preferred embodiments of the present invention will be described in detail with reference to the accompanying drawings.

FIG. 1 is a block diagram illustrating the configuration of a power control apparatus according to a load of a hybrid excavator.

As illustrated in FIG. 1, the power control device is configured to include an ESS (Energy Storage System) 101, a SW PEC (Swing Motor Power Electric Controller) 102, an ISAM PEC (Integrated Starter & Alternator Motor Power Electric Controller) 103; a V-ECU 104, and a H-ECU (H-Electronic Control Unit) 105.

That is, the power control device includes the ESS 101, the SW PEC 102 and the ISAM PEC 103 respectively connected to the ESS 101, and the H-ECU 105 comparing an actual power value (P3), which is obtained by adding a power value (P1) calculated by a voltage or current value input to or output from the SW PEC 102 to a power value (P2) calculated by a voltage or current value input to or output from the ISAM PEC 103, with a power value P4 required for a load that is calculated by applying an operation amount of a RCV lever and an engine RPM value, which are input from the V-ECU 104, determining there is abnormality in the case where a difference between the two power values exceeds a set error range, and operating to cut off a power supplied from the ESS 101 to the PECs 102 and 103 and a power supplied between the PECs 102 and 103, or comparing a power value (P5) calculated by a voltage or current value input to or output from the ESS 101 with the power value (P4) required for the load, determining there is abnormality in the case where a difference between the two power values exceeds the set error range, and operating to cut off the power supplied from the ESS 101 to the PECs 102 and 103 and the power supplied between the PECs 102 and 103.

Here, the H-ECU 105 operates to cut off the power in the case where the difference between the actual power value that is used in the actual load or the ESS 101 and the power value required for the load exceeds the set error range. Specifically, the H-ECU 105 compares the actual power value (P3), which is obtained by adding the power value (P1) calculated by the voltage or current value input to or output from the SW PEC 102 to the power value (P2) calculated by the voltage or current value input to or output from the ISAM PEC 103, with the power value P4 required for the load (P4=A×the operation amount of the RCV lever+B×the engine RPM value+α, herein A and B are coefficients and α is a power loss value) that is calculated by applying the operation amount of the RCV lever and the engine RPM value, which are input from the V-ECU 104, determines there is abnormality in the case where the difference between the two power values exceeds the set error range, and controls to cut off the power supplied from the ESS 101 to the PECs 102 and 103 and the power supplied between the PECs 102 and 103, or compares the power value (P5) calculated by the voltage or current value input to or output from the ESS 101 with the power value (P4) required for the load, determines there is abnormality in the case where the difference between the two power values exceeds the set error range, and controls to cut off the power supplied from the ESS 101 to the PECs 102 and 103 and the power supplied between the PECs 102 and 103.

Preferably, the H-ECU 105 includes a first actual power value calculation unit calculating the actual power value (P3) by adding the power value (P1) calculated by the voltage or current value input to or output from the SW PEC 102 to the power value (P2) calculated by the voltage or current value input to or output from the ISAM PEC 103; a load required power value calculation unit calculating the power value for the load (P4=A×the operation amount of the RCV lever+B× the engine RPM value+α, herein A and B are coefficients and α is the power loss value) calculated by applying the operation amount of the RCV lever and the engine RPM value received from a V-ECU (Vehicle Electronic Control Unit) 104; and a first power-off control unit determining there is abnormality in the case where the difference between the calculated actual power value (P3) and the power value (P4) required for the load exceeds the set error range, and operating to cut off the power supplied from the ESS 101 to the PECs 102 and 103 and the power supplied between the PECs 102 and 103. The H-ECU 105 further includes a second actual power value calculation unit calculating the actual power value (P5) by the voltage or current value input to or output from the ESS 101; and a second power-off control unit determining there is abnormality in the case where the difference between the actual power value (P5) and the power value (P4) required for the load exceeds the set error range, and operating to cut off the power supplied from the ESS 101 to the PECs 102 and 103 and the power supplied between the PECs 102 and 103.

Hereinafter, the operation of the power control apparatus according to a load of a hybrid excavator according to the present invention as illustrated in FIG. 1 will be described.

First, the actual power value (P3) is calculated through addition of the power value (P1) calculated by the voltage or current value input to or output from the SW PEC 102 to the power value (P2) calculated by the voltage or current value input to or output from the ISAM PEC 103.

Then, the power value for the load (P4=A×the operation amount of the RCV lever+B×the engine RPM value+α, herein A and B are coefficients and α is the power loss value) is calculated through application of the operation amount of the RCV lever input from the V-ECU (Vehicle Electronic Control Unit) 104 and the engine RPM value.

That is, in the case of the power value (P1) of the SW PEC 102, the swing amount differs according to the operation amount $P_{1D}$ of the RCV lever, and thus the value of P1 is changed.

Further, the power value (P2) of the ISAM PEC 103 is changed according to an engine RPM.

Accordingly, by receiving the operation amount $P_{1D}$ of the RCV lever and the engine RPM ($P_{2D}$) from the V-ECU 104, the actual load amounts of P1 and P2 can be known.

Since the above-mentioned power values are increased or decreased according to the increase or decrease of the load amounts, the required power values of P1 and P2 can be known from the respective load amounts.

$$P1 \cong P_{1D}, P2 \cong P_{2D}, P4 = P1 + P2 + \alpha = A \times P_{1D} + B \times P_{2D} + \alpha (A, B = \text{Coefficient}, \alpha \text{ is the power loss value of a wiring or a relay})$$

Next, the calculated actual power value (P3) and the power value (P4) required for the load are compared with each other.

If the difference between the two power values exceeds the set error range as the result of the comparison, it is determined that there is abnormality, and the power supplied from the ESS 101 to the PECs 102 and 103 and the power supplied between the PECs 102 and 103 are cut off.

Then, even if the difference between the actual power value P5 that is calculated by the voltage or current value input to or output from the ESS 101 and the power value (P4) required for the load exceeds the set error range, it is determined that there is abnormality, and the power supplied from the ESS 101 to the PECs 102 and 103 and the power supplied between the PECs 102 and 103 are cut off.

As described above, according to the present invention, if the difference between the actual power value actually used in the load (SW PEC and ISAM PEC) or in the ESS and the power value required for the actual use in the load is equal to or larger than the set error value, the power that is supplied from the ESS to the PECs and the power that is supplied between the PECs are controlled to be cut off, and thus the high voltage is prevented from being continuously supplied to the circuits to thereby prevent the secondary problems (e.g., fire, trouble of equipment, and the like) from occurring due to the high voltage.

INDUSTRIAL APPLICABILITY

The present invention can be used in the power control apparatus and method according to the load of the hybrid excavator, and more particularly, the present invention can be used in the power control apparatus and method according to the load of the hybrid excavator, in which if the difference between the actual power value actually used in the load (SW PEC and ISAM PEC) or in the ESS and the power value required for the actual use in the load is equal to or larger than the set error value, the power that is supplied from the ESS to the PECs and the power that is supplied between the PECs are controlled to be cut off, and thus the high voltage is prevented from being continuously supplied to the circuits to thereby prevent the secondary problems (e.g., fire, trouble of equipment, and the like) from occurring due to the high voltage.

The invention claimed is:

1. A power control apparatus according to a load of a hybrid excavator, comprising:
    an ESS (Energy Storage System);
    a SW PEC (Swing Motor Power Electric Controller) and an ISAM PEC (Integrated Starter & Alternator Motor Power Electric Controller) connected to the ESS; and
    a H-ECU (H-Electronic Control Unit) comparing an actual power value (P3), which is obtained by adding a power value (P1) calculated by a voltage or current value input to or output from the SW PEC to a power value (P2) calculated by a voltage or current value input to or output from the ISAM PEC, with a power value required for a load (P4) that is a function of an operation amount of a RCV lever and an engine RPM value, determining there is abnormality in the case where a difference between the two power values exceeds a set error range, and operating to cut off a power supplied from the ESS to the PECs and a power supplied between the PECs, or comparing a power value (P5) calculated by a voltage or current value input to or output from the ESS with the power value (P4) required for the load, determining there is abnormality in the case where a difference between the two power values exceeds the set error range, and operating to cut off the power supplied from the ESS to the PECs and the power supplied between the PECs.

2. The power control apparatus according to claim 1, wherein the H-ECU comprises:
    a first actual power value calculation unit calculating the actual power value (P3) by adding the power value (P1) calculated by the voltage or current value input to or output from the SW PEC to the power value (P2) calculated by the voltage or current value input to or output from the ISAM PEC;
    a load required power value calculation unit calculating the power value for the load (P4) that is a function of an operation amount of a RCV lever and an engine RPM value received from a V-ECU (Vehicle Electronic Control Unit); and
    a first power-off control unit determining there is abnormality in the case where the difference between the calculated actual power value (P3) and the power value (P4) required for the load exceeds the set error range, and operating to cut off the power supplied from the ESS to the PECs and the power supplied between the PECs.

3. The power control apparatus according to claim 2, wherein the H-ECU further comprises:
    a second actual power value calculation unit calculating the actual power value (P5) by the voltage or current value input to or output from the ESS; and
    a second power-off control unit determining there is abnormality in the case where the difference between the actual power value (P5) and the power value (P4) required for the load exceeds the set error range, and operating to cut off the power supplied from the ESS to the PECs and the power supplied between the PECs.

4. A power control method according to a load of a hybrid excavator, comprising:
    comparing an actual power value (P3), which is obtained by adding a power value (P1) calculated by a voltage or current value input to or output from a SW PEC to a power value (P2) calculated by a voltage or current value input to or output from an ISAM PEC;
    calculating a power value required for a load (P4) that is a function of an operation amount of an RCV lever input from a V-ECU (Vehicle Electronic Control Unit) and an engine RPM value;
    determining there is abnormality in the case where a difference between the calculated actual power value (P3) and the power value (P4) required for the load exceeds a set error range, and operating to cut off a power supplied from an ESS to the PECs and a power supplied between the PECs;

calculating an actual power value (P5) by a voltage or current value input to or output from the ESS; and determining there is abnormality in the case where a difference between the actual power value P5 and the power value (P4) required for the load exceeds the set error range, and operating to cut off the power supplied from the ESS to the PECs and the power supplied between the PECs.

\* \* \* \* \*